United States Patent [19]
Graham

[11] 3,979,054
[45] Sept. 7, 1976

[54] COIN COLLECTION SYSTEM

[75] Inventor: Billy J. Graham, Smithfield, Tex.

[73] Assignee: National Pride Equipment, Inc., Livonia, Mich.

[22] Filed: July 27, 1973

[21] Appl. No.: 383,086

[52] U.S. Cl. .............................. 232/43.2; 109/50; 232/16
[51] Int. Cl.² ........................................ B65D 91/00
[58] Field of Search ............ 232/43.1, 16, 1 R, 1 E, 232/43.2, 9, 12, 15; 109/56, 58, 50, 1 R, 2; 219/200, 201; 312/236, 31.06

[56] References Cited
UNITED STATES PATENTS

| | | | |
|---|---|---|---|
| 160,676 | 3/1875 | Imlay | 232/9 |
| 2,039,018 | 4/1936 | Miller | 232/1 R |
| 2,555,738 | 6/1951 | Gadda | 232/43.1 X |
| 2,617,012 | 11/1952 | Westley | 219/201 X |
| 2,617,325 | 11/1952 | Astle | 219/201 X |
| 2,651,703 | 9/1953 | Atkins | 312/236 UX |
| 2,761,944 | 9/1956 | Yannelli | 219/201 |
| 2,964,237 | 12/1960 | Henderson | 232/16 |
| 2,987,601 | 6/1961 | Levin | 219/200 UX |
| 3,099,914 | 8/1963 | DeWitt et al. | 219/200 UX |
| 3,263,943 | 8/1966 | Share et al. | 232/16 X |
| 3,358,467 | 12/1967 | Hickox et al. | 219/200 UX |
| 3,419,209 | 12/1968 | Munn | 232/1 R |
| 3,441,716 | 4/1969 | Lopata | 232/15 X |

FOREIGN PATENTS OR APPLICATIONS

| | | | |
|---|---|---|---|
| 291,522 | 3/1968 | Australia | 109/50 |
| 1,227,434 | 4/1971 | United Kingdom | 109/50 |

*Primary Examiner*—Dennis L. Taylor
*Attorney, Agent, or Firm*—Wofford, Felsman, Fails & Zobal

[57] ABSTRACT

The specification discloses a system for use for safely collecting and storing coins in motor vehicle cleaning facilities and which may be reliably used outdoors in all types of weather and under many different adverse conditions. The system comprises a safe to be embedded in concrete and having metal forms for receiving the concrete when wet and which forms part of the completed structure when the wet concrete hardens. The safe has a conduit extending therefrom defining a coin inlet and a door in one end for removing the coins collected. In one aspect, a drain conduit extends from the bottom of the safe for draining water which may be inadvertently or deliberately injected into the safe through the coin inlet and in another embodiment, there is provided a conduit for receiving an electrical cord to allow an electrical heater to be located in the safe.

1 Claim, 11 Drawing Figures

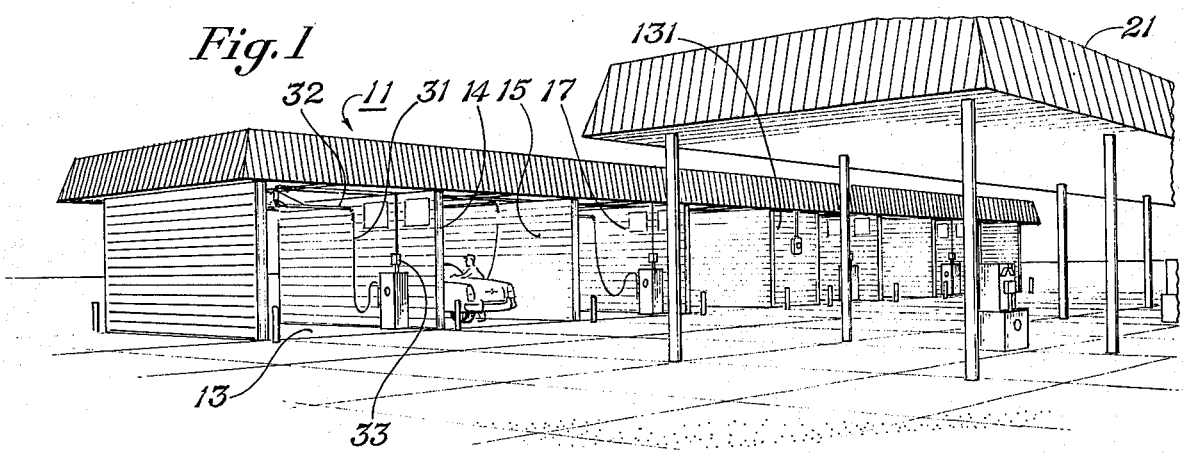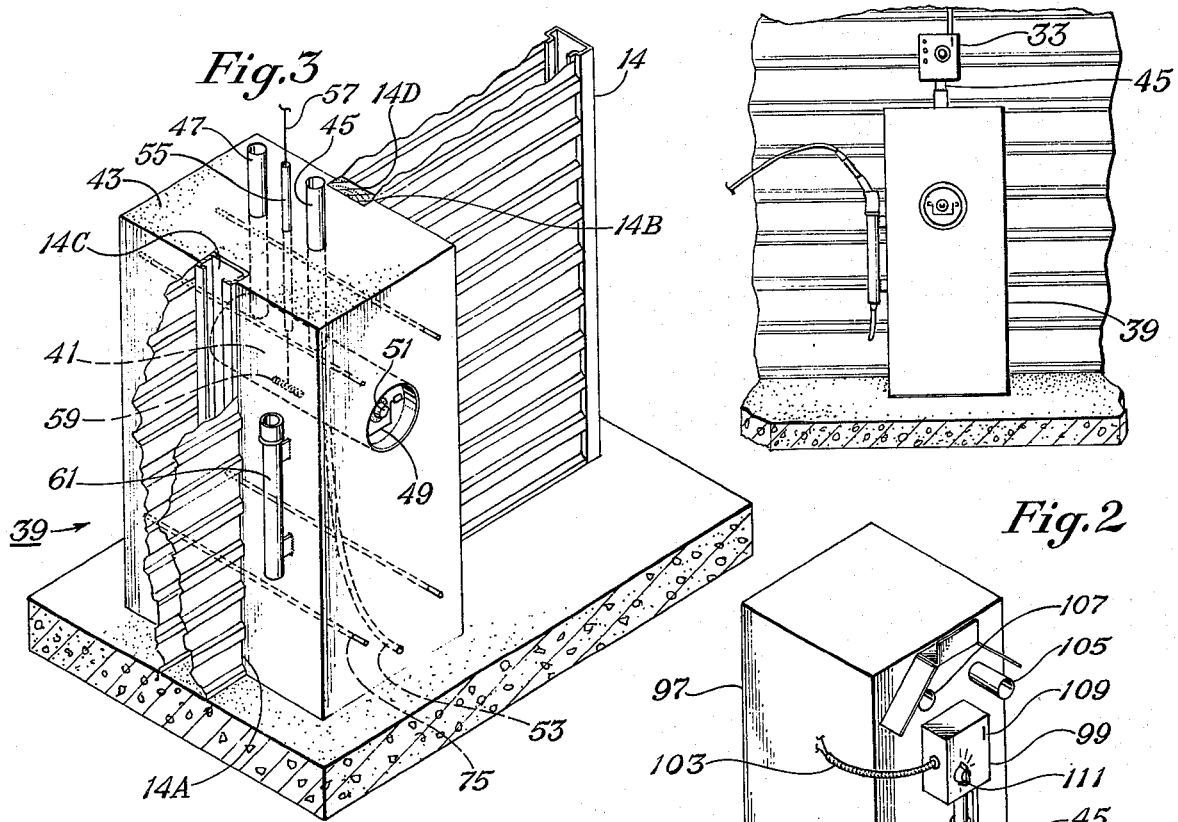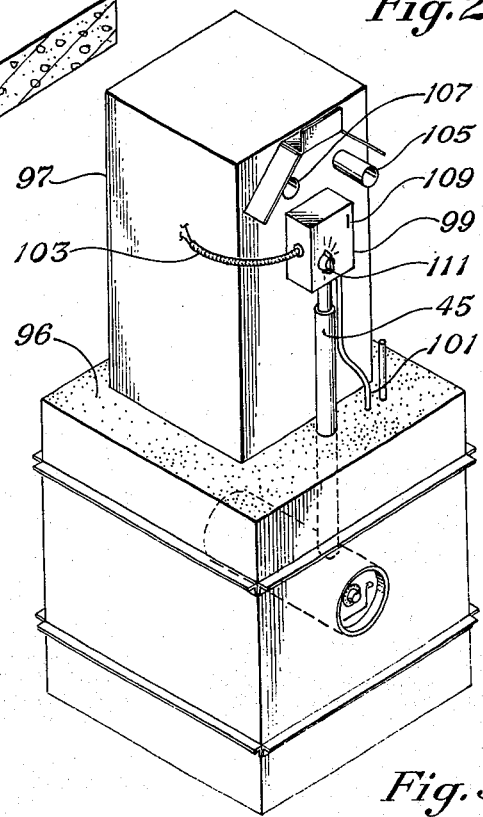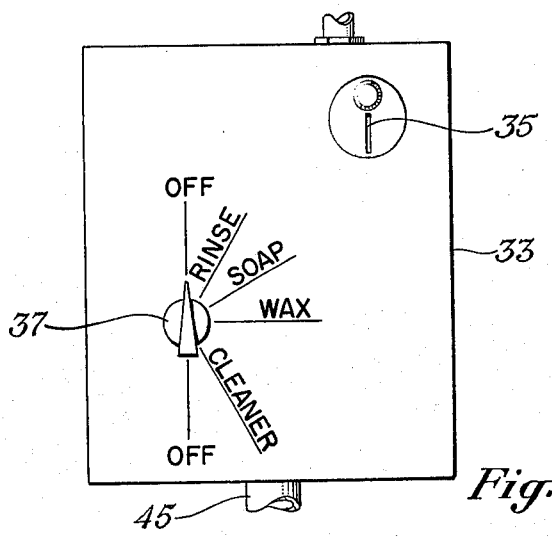

COIN COLLECTION SYSTEM

BACKGROUND OF THE INVENTION

This invention relates a system for use in collecting and safely storing coins in a coin operated facility.

In coin operated facilities, particularly outdoor coin operated car washing systems, problems occur with vandals who continually break open conventional coin receiving boxes or else severely damage the boxes or coin operated mechanisms in an attempt to illegally obtain the coins deposited therein. This not only results in a loss in profits but requires continual replacement of the equipment which eventually may cause financial disaster unless a watchman is hired 24 hours a day or else a person is employed to continuously travel from facility to facility to collect the coins shortly after they are deposited. This, of course, is also expensive and can substantially reduce the profits.

SUMMARY OF THE INVENTION

It is the object of the present invention to provide an economical system for collecting and safely storing coins in coin operated facilities and which does not have to be continually monitored against vandals and furthermore which can be reliably operated outdoors in all types of weather and under many adverse conditions.

In one aspect, the system comprises a coin collection safe to be embedded in concrete and having a conduit extending therefrom defining a coin inlet and a door in one end for removing the coins collected. In addition, metal side walls are provided for surrounding the safe to define a space around the safe for receiving wet cement whereby the metal side walls formed part of the completed structure for holding the concrete which embeds the safe when the wet concrete is inserted into and hardens in the space between the safe and the surrounding walls.

After installed in place, an electrically operated timing meter is coupled to the coin inlet for receiving coins through a coin slot in the front of the meter box. For car washing operations, the meter comprises a rotary switch for allowing rinse, soap, wax, or tire wash operations to be selected for a given time interval upon depositing a coin or coins in the slot and upon proper positioning of the rotary switch.

In a further aspect, a drain conduit is connected to the bottom of the safe for draining liquid which may be deliberately or inadvertently injected therein by way of the coin slot of the timing meter box.

In another aspect, another conduit is connected to the safe for receiving an electrical cord to allow an electrical heater to be installed in the safe.

The system also may be employed for use for vacuum operations to allow one to remove dirt and dust from the interior of a car. In this embodiment, if the vacuum facility is located away from the water hose, the drain and electrical heater arrangement is not needed. In addition, the switch of the timing meter may be movable to only on-off positions to allow only vacuuming operations to be performed for a limited time upon insertion of a coin in the timing meter slot.

In a further aspect, the system is adapted to be used in two stalls formed on each side of a separating wall in a car cleaning facility for receiving and storing coins from both stalls. The walls of the system comprise two sections, each section having three sides adapted to surround opposite ends of the safe with a gap between said sections intermediate the opposite ends of the safe to allow the system to be inserted in an opening formed through the separating wall of the car cleaning facility with the edges of the separating wall defining the opening, located in the gap whereby opposite ends of the safe may be located in the two stalls formed on opposite sides of the separating wall. In this embodiment, a coin receiving conduit extends from opposite ends of the safe for forming two coin inlets, one for each stall.

BRIEF DESCRIPTION OF THE DRAWINGS

FIG. 1 illustrates a coin operated car cleaning facility having equipment for allowing an individual to wash the exterior of his car as well as to vacuum the interior thereof;

FIG. 2 illustrates an installed system for collecting and storing coins in a stall of the facility of FIG. 1;

FIG. 3 is a perspective view in partial cross section illustrating an installed system for use for collecting and storing coins in adjacent stalls separated by a separating wall;

FIG. 4 illustrates the front of an electrically operated timing meter employed in the systems of FIGS. 2 and 3;

FIG. 5 illustrates an installed system for use for collecting and storing coins for controlling vacuuming operations in the facility of FIG. 1;

DETAILED DESCRIPTION OF THE INVENTION

Figure 8:
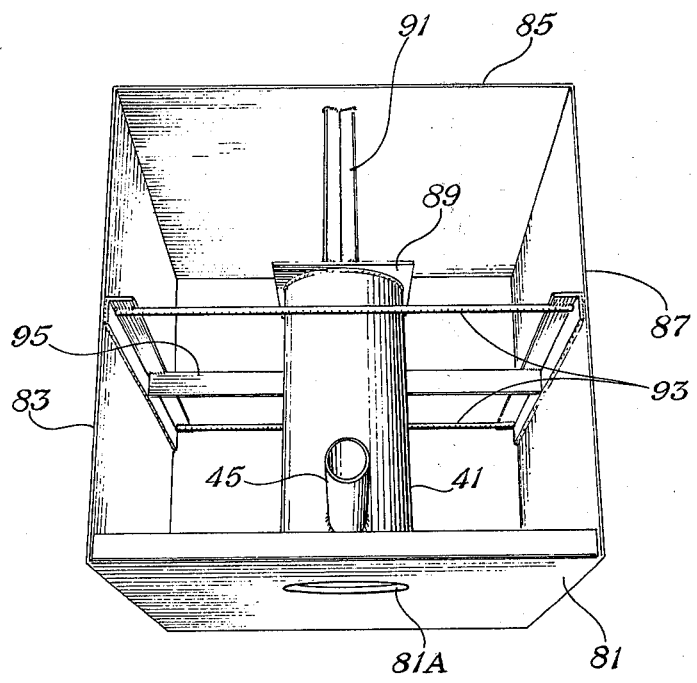
FIG. 8 illustrates the system of FIG. 5 before installation.

Referring now to FIG. 1, the outdoor coin operated motor vehicle cleaning system illustrated comprises a partial enclosure 11 having a plurality of stalls 13, 15, 17, etc. with equipment located therein for allowing one to clean the exterior of his car. Also provided is a canopy 21 for sheltering equipment for allowing one to vacuum the interior of his car. In the partial enclosure 11 of FIG. 1, each adjacent stall is separated by a separating wall, for example, stalls 13 and 15 are separated by wall 14. In each stall, there is provided a hose 31 extending from a boon 32 to obtain under pressure water, liquid soap, liquid wax, or liquid whitewall cleaner and a coin operated timing meter 33 with a rotary switch to allow either of these liquids to be obtained by depositing a coin or coins in the meter. The boon is illustrated in more detail in FIG. 9 while the front of the coin operated timing meter 33 is in more detail in FIG. 4. As seen in FIG. 4, the front of the timing meter box has a coin slot 35 for receiving a coin to control certain valves to inject through the hose 31 either hot water, liquid soap, liquid wax, or liquid whitewall cleaner, dependent upon which position a rotary switch 37 is located.

Referring to FIGS. 2 and 3, the coin meter is coupled to a storage system 39 comprising a steel safe 41 embedded in concrete 43 and having an inlet conduit 45 extending from the safe 41 to the coin meter. Thus when a coin is deposited in the coin meter, it will pass from the meter through conduit 45 to the interior of the safe. In the embodiment of FIG. 3, the safe 41 serves two stalls and has a conduit 45 leading to one end of the safe in one stall and a conduit 47 leading to the other end of the safe in the other stall formed on the other side of wall 14. A separate coin meter for each stall will be coupled to each conduit 45 and 47. Formed in one end of the safe 41 is a door 49 located in one stall to allow one to remove the coins deposited in the safe 41 by way of its coin meters. The door 49 preferably employs a combination lock which may be opened by a dial 51. The safe 41 also has a drain conduit 53 coupled to the bottom thereof and which extends out of the concrete block 43 to allow water, which may be inadvertently or deliberately injected therein through the slot 35, to drain out of the safe to provide protection for the combination lock against moisture which may otherwise ruin the locking mechanism and prevent one from opening the safe. Also provided is an upper conduit 55 leading to the safe for receiving an electrical cord 57 to allow an electrical heater 59 to be located in the safe and operated to maintain the interior of the safe dry and to prevent moisture injected in the safe from freezing which may otherwise occur in cold weather and which also may damage the locking mechanism or prevent one from opening the lock. Attached to one side of the installed system 39 in each stall is a holder 61 for holding the end of the hose 31 when not in use. From experience, it has been found that the coin collection system illustrated in FIGS. 2 and 3 is practically destruction proof, and hence provides a very secure system for holding the coins deposited therein and which works reliably in all types of weather and under many adverse conditions and yet which allows one to readily remove the coins when desired by merely opening the door 49 by use of the dial 51. Preferably the dial 51 is a removable dial and which is removed when not in use to prevent destruction thereof by vandals. Moreover, the system of FIGS. 2 and 3 may be readily and economically installed since pre-constructed forms are provided for receiving and holding wet concrete poured around the safe thereby minimizing labor costs at the construction site. After installation, these forms remain a part of the completed security system.

Figure 6:
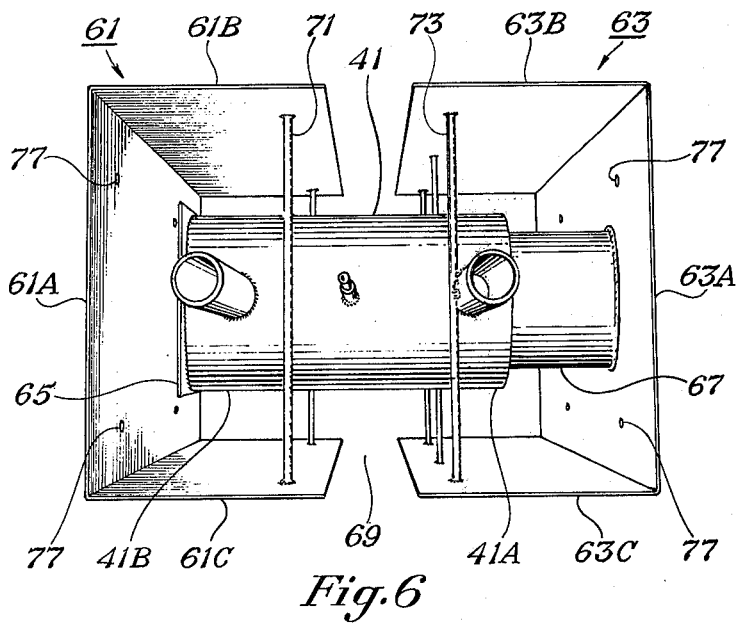
FIG. 6 illustrates the system of FIG. 3 prior to installation.
Figure 7:
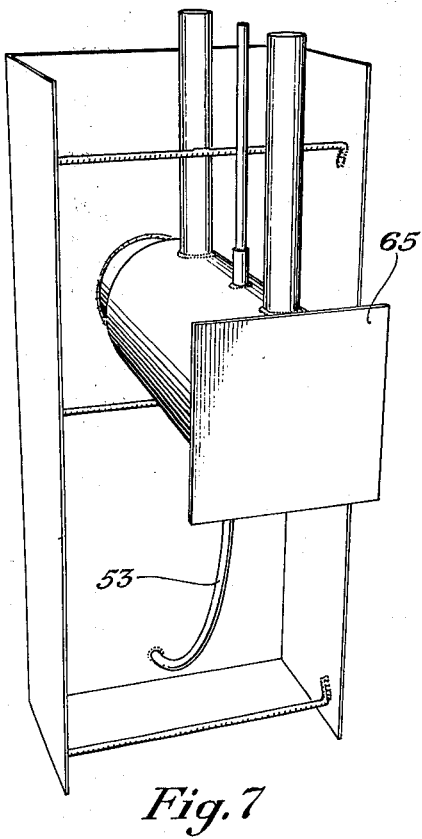
FIG. 7 is an end view of the system of FIG. 6 with one of the surrounding walls removed.

Referring to FIGS. 6 and 7, the forms for holding the concrete comprise U-shaped metal forms or sections 61 and 63 which are adapted to surround the safe 41 for forming a space around the safe for holding wet concrete until it drys and hardens. A metal plate 65 is welded to end 41A of the safe 41 while a metal cylindrical extension 67 is welded to the end 41B of the safe around its door 49 and to end plate 63A of form 63. End plate 63A has an aperture formed therethrough which is aligned with the opening formed through cylindrical extension 67 to allow access to the door 49 from the exterior after the section 63 is welded to the safe. As illustrated, the sides of the forms 61 and 63 are spaced apart when the forms are assembled in place ready to receive concrete to form a gap 69 therebetween into which the separating wall between two stalls is located. In this respect, a separating wall will have an opening cut therethrough to allow the assembly to be inserted therein with the edges of the opening of the separating wall being located within gaps 69. This is clearly illustrated in FIG. 3 wherein edges 14A and 14B of wall 14 are shown located in the gaps 69. In FIG. 3, reference numeral 14C identifies an internal supporting metal column of the wall while reference numeral 14D identifies a wood post inserted between the side plates of the wall at the edge of the opening to prevent wet concrete from flowing inward between the plates when poured into the forms. In shipping the assembly of FIG. 6, it will be shipped in two pieces comprising the form 61 and the safe 41 connected to the form 63. Support rods 71 extend from one side of the form 61 to the other for providing additional support. Similarly, support rods 73 extend from one side of the form 63 for support purposes. When it is desired to install the assembly, it will be inserted through hole formed through the separating wall and threaded rods 75 inserted through apertures 77 formed through walls 61A and 63A. After the rods have been inserted in place, the two forms 61 and 63 will be bolted together and to the safe with bolts threaded onto the protruding ends of the rods 75. In addition, the forms 61 and 63 will be bolted to metal rods or plates extending upward from the concrete floor of the facility. Once the assembly has been installed in place, wet concrete will be poured in the space between the safe and the surrounding wall structure to form in effect a vandal proof assembly wherein the forms 61 and 63 will form part of the completed security system after the cement hardens. Although not clearly illustrated, when the assembly is installed in place ready to receive wet concrete, a 5-inch space will exist between end plate 61A of form 61 and plate 65 which will be fitted with concrete. After the concrete hardens, the timing meter will be attached to conduits 45 and 47 and an electrical strip type heater installed in the safe, if desired. With the above arrangement, the safe and forms may be economically constructed at one location; shipped to various other locations where car cleaning facilities are under construction; and then readily installed thereby eliminating the necessity of custom building the forms at the facility sites. This minimizes labor costs and yet provides a safe and reliable assembly for receiving and collecting coins in the coin operated car cleaning facility.

In the embodiment of FIG. 8, the safe 41 illustrated has a single coin receiving conduit 45 and is employed to form the assembly of FIG. 5 for use for vacuuming purposes which is located under the awning 21. Since the assembly of FIG. 5, when installed under the awning 21 is located away from the water or liquid available at the washing facility 11, the drain 53 and the electrical lead conduit 55 for allowing a heater to be installed will not be needed and hence are not attached to the safe. In the assembly of FIG. 8, four walls 81, 83, 85, and 87 are connected together and to the safe with wall 81 being welded to the front of the safe. An aperture 81A extends through wall 81 to allow access to the safe's door. The other end of the safe has a plate 89 welded thereto and a brace 91 is welded to the plate 89 and to the wall 85. Cross support comprising rods 93 and a brace 95 are welded to sides 83 and 87 of the assembly. The assembly of FIG. 8 comprising the safe 41 and the four walls connected to the safe will be shipped to desired locations and installed at the cleaning site by bolting the walls of the assembly to vertical rods or plates extending from the ground and then filling the space between the walls and the safe with concrete 96. After the concrete drys and hardens, the surrounding walls form part of the completed security system. After the assembly of FIG. 8 has been installed, in place, an upper box 97 containing a vacuum motor will be bolted to metal rods embedded in the concrete and a timing meter 99 connected to the coin receiving conduit 45. The electrical leads from a power control room may be extended to the assembly of FIG. 5 underground and then up through the assembly by way of an electrical conduit 101 embedded in the concrete, to the timing meter 99. From the meter 99 electrical leads are extended through metallic conduit 103 and are connected to the vacuum motor in the box 99. A conduit 105 extends from the vacuum motor out of the box 97 to which a vacuum hose is connected. Aperture 107 is for exhaust purposes. The meter 99 has a coin slot 109 and a switch 111 which may be turned to the on-off position.

In one embodiment, the safes 41 employed are purchased from Major Safe Company of Los Angeles. The safes employed for the car washing facilities have a diameter of 12 inches and a length of 18 inches while those employed for the vacuum facilities have a diameter of 8 inches a length of 18 inches. The safes were modified by installing the coin collection conduits and for use for car washing facilities, by installing the drain conduit and the electrical lead conduit for a heater, if desired. In certain areas of the country where the temperatures do not fall too low, the electrical heater is not needed and hence the electrical lead conduit 55 is not needed. If the safe is to be used in a single stall of a car washing facility for example, an end stall of a facility which has an odd number of stalls, then the assembly of FIG. 8 may be employed for this purpose. Only one coin inlet conduit will be connected to the safe as well as a drain conduit and an electrical lead conduit for a heater if needed. For use for vacuum operations, only one inlet conduit 45 will be connected to the safe. It is to be understood, however, that a single safe may be employed to collect coins from two separate coin meters for vacuum operations, in which case two coin inlet conduits will be connected to the safe.

In one embodiment, the assembly of FIGS. 3 and 6 has a height of 4 feet, a length of 30 inches and a width of 20 inches. The assembly of FIG. 8 has a height of 3 feet and four sides of 30 inches each. Fourteen gauge iron plates were employed to form the walls for receiving the concrete. The timing meters 33 and 99 were purchased from H. W. Greenwauld of Brooklyn, New York and comprise an electrical timer. For use for car washing operations for selecting the operations illustrated in FIG. 4, they were modified by installing the rotary switch 37.

Figure 9:
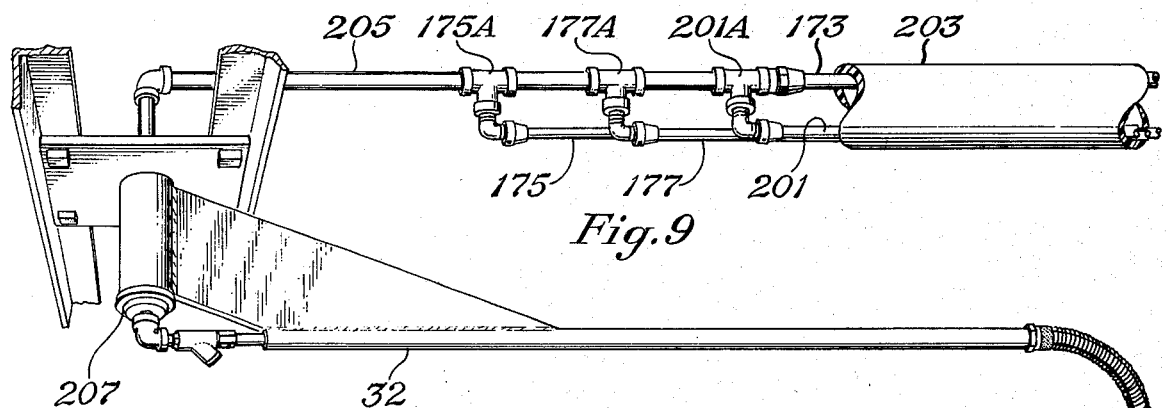
FIG. 9 illustrates an overhead boon and hose employed in one of the stalls of the facility of FIG. 1.

The pumping equipment and liquid reservoirs for the stalls of the car washing facility 11 are located in a control room identified at 131 in FIG. 1. This equipment is illustrated in block diagram in FIG. 10 and comprises a rinse container 133 for holding water, a liquid soap container 135, a hot water heater 137, a liquid wax container 139, a liquid whitewall cleaner container 141, a water softener container 143, and a brine tank 145. The rinse container 133 is connected to the hot water heater by way of conduit 147 and a small pump 149 is employed for circulating the water between containers 133 and 137. The rinse container 133 also is connected to the water softener container 143 by way of conduit 151 while the water softener container 143 is connected to the brine tank 145 by way of conduit 153. Coupled to the rinse container 33, the liquid soap container 135 and the liquid wax container 139 is a pumping system illustrated by 161. The pumping system comprises a main pump which is a positive displacement pump of the plunger type for pumping water from the rinse container 133 and which also operates separate diaphragm pumps for pumping liquid wax and liquid soap from containers 139 and 135. Connection between the pumping system 161 and the rinse container 133, the soap container 135 and the wax 139 is by way of conduits 163, 165, and 167. The liquid outlet for the rinse water from the main pump for a given stall is illustrated at 173 while the outlets from the separate diaphragm pumps for the liquid soap and the liquid wax for the same stall are illustrated at 175 and 177. Coupled to outlets 173, 175, and 177 are solenoid operated valves 183, 185, and 187 respectively and which are located in the control room 131. A separate pump 189 is coupled to the whitewall cleaner container 141 by way of conduit 191 for pumping the liquid cleaner out of the container and has an outlet conduit 201 extending therefrom. A solenoid operated valve 203 also is coupled to conduit 201 and is located in the control room 131. From the solenoid operated valves, the outlet conduits extend to the given stall. Although not shown, a separate set of outlet conduits and solenoid operated valves from the pumping system will be provided for each stall for flowing water, liquid soap, liquid wax, and liquid whitewall cleaner to each stall. In FIG. 9, the rinse conduit 173, the soap conduit 175, the wax conduit 177, and the whitewall cleaner conduit 201 are illustrated for a given stall and extend from the control room to the stall through a protective cover 203. Conduits 173, 175, 177, and 201 are connected to a common conduit 205 by way of connections 175A, 177A and 201A. Conduit 205 is connected to a swivel connection 207 and then to the boon 32 and hose 31.

By dialing the rotary switch 37 to the rinse position, only solenoid valve 183 will be actuated to apply water to the conduit 205 whereas by dialing the switch 37 to the soap or wax position, only valve 185 or 187 will be actuated to apply soap or wax to the conduit 205. When the switch 37 is dialed to the whitewall cleaner position, only solenoid actuated valve 203 will be actuated to apply whitewall cleaner to conduit 205. The pressure applied to the water line 173 is 800 pounds while that applied to the soap line 175 and to the wax line 177 is 850 pounds per square inch when their solenoid valves are opened. Whitewall cleaner pump 189 is a low pressure pump and applies about 30 pounds to line 201 when valve 203 is open. With this arrangement shown in FIGS. 9 and 10, water, soap, liquid wax, or whitewall cleaner will be available in a given stall with an instant changeover upon switching the rotary switch 37 to the desired position. For example, when valve 183 is open and valves 185, 187, and 203 closed, pressure in their lines will drop to zero and the 800 pounds pressure in line 173 will prevent liquid in lines 175, 177, and 201 from flowing into the line 205 whereby only water will flow into line 205. However, when valve 183 is closed, and for example valve 187 opened, pressure in line 173 will drop to zero and pressure in line 177 will allow only liquid wax to be injected into line 205. Since it is available in line 177 in the stall, it will flow into line 205 promptly with little delay upon movement of the switch 37 to the wax position. The time required to obtain the desired liquid in hose 31 upon switching or changeover from another liquid is about 3–5 seconds.

Figure 10:
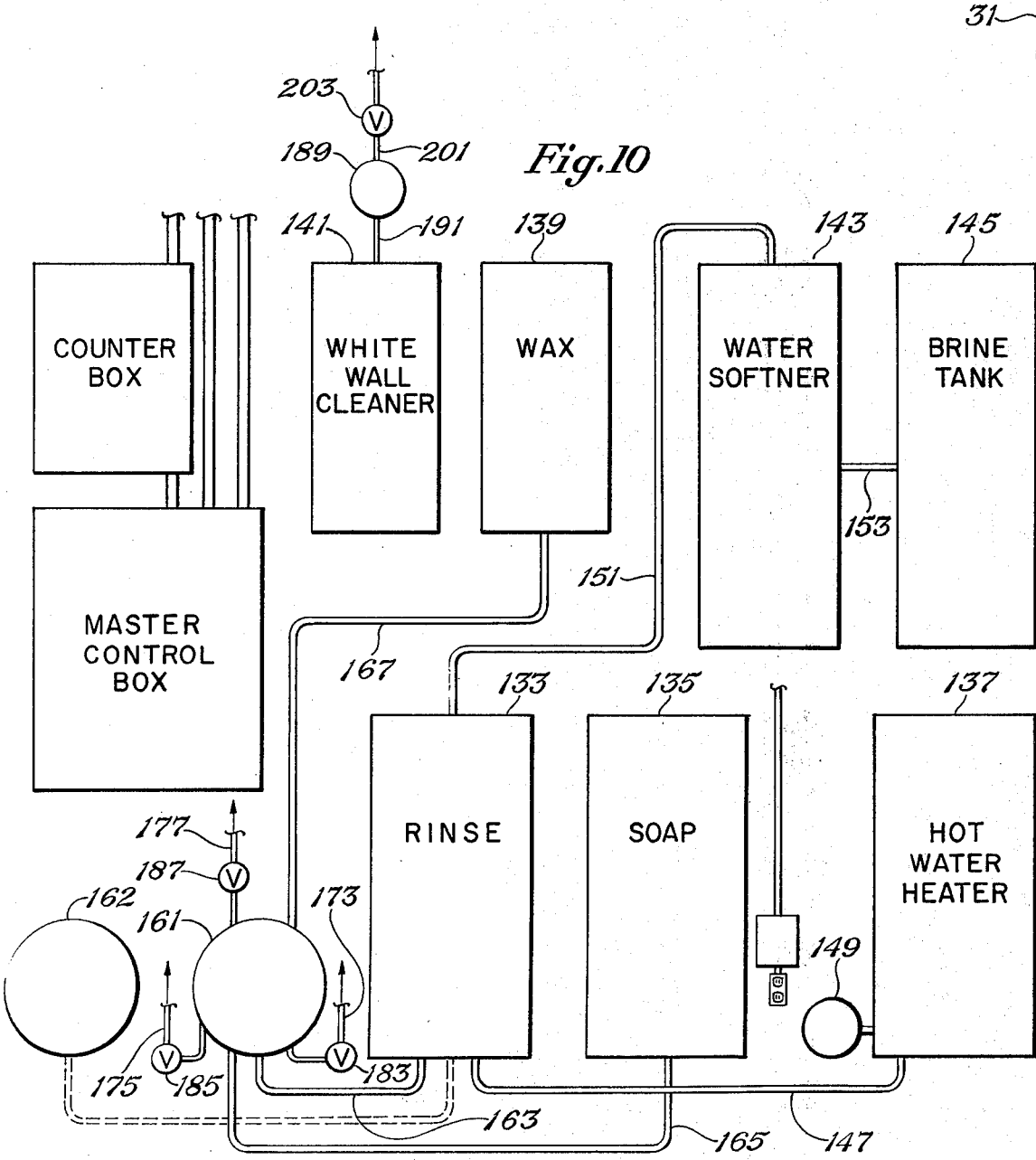
FIG. 10 is a block diagram illustrating the reservoir and pumping system for storing and pumping liquid water, wax, soap, and whitewall cleaner for use in the facility of FIG. 1.

In FIG. 10, there is illustrated a standby pump 162 which may be switched manually on in the event that pump 161 develops problems.

Figure 11:
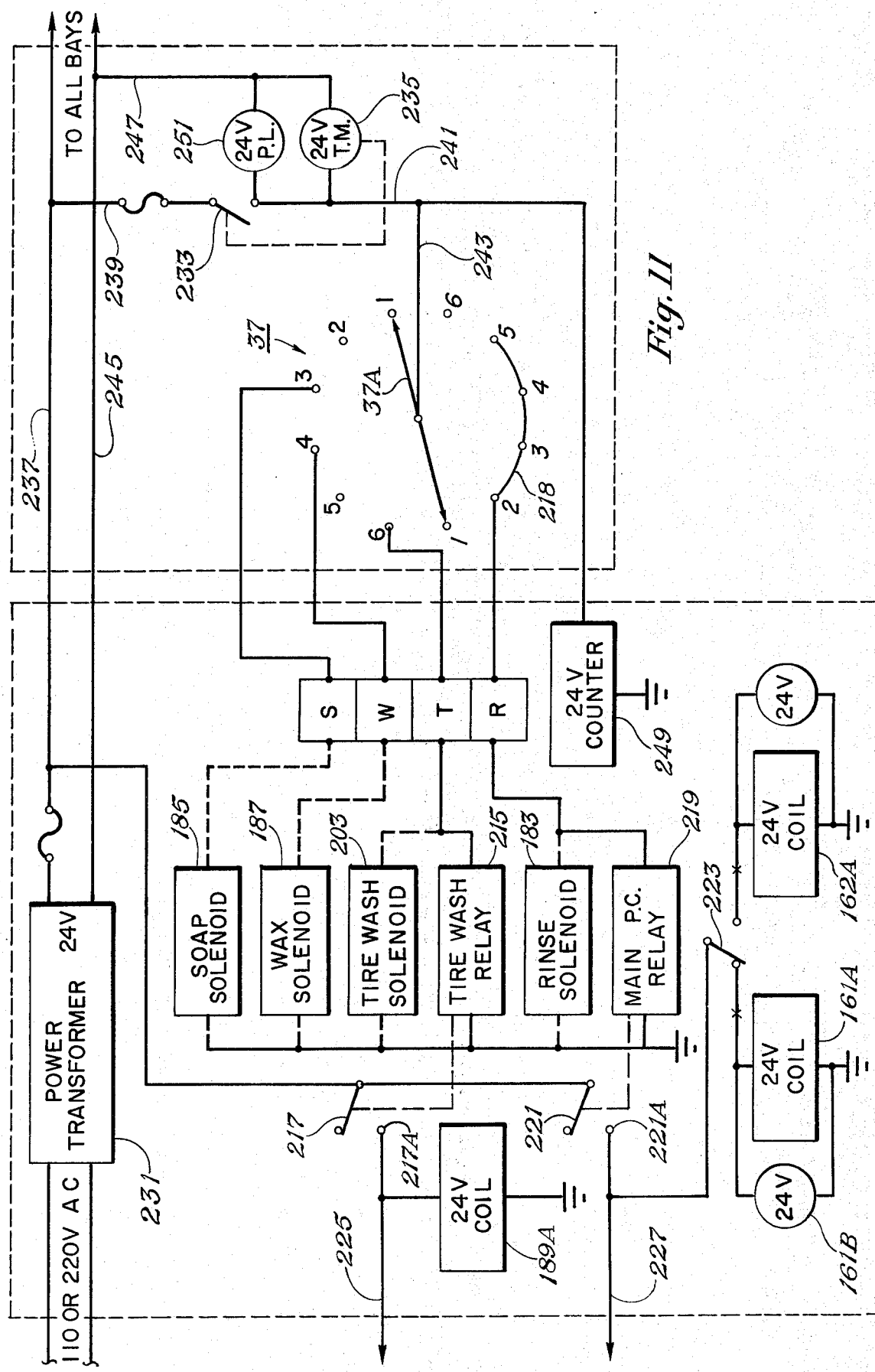
FIG. 11 illustrates in block diagram the electrical control system for controlling the system of FIG. 10 when employed in the facility of FIG. 1.

Referring now to FIG. 11, there will be described a typical timing meter, rotary switch and control system for each stall. The rotary switch 37 comprises contact terminals 1—1, 2—2, 3—3, 4—4, 5—5, and 6—6, and a rotary switch member 37A which is adapted to contact opposite terminals simultaneously when moved to the various positions. The upper terminal 3 is connected to the soap solenoid 185; and upper terminal 4 is connected to the wax solenoid 187; and the upper terminal 6 is connected to the tire wash or whitewall cleaner solenoid 203 and also to a tire wash relay 215, the latter of which will move switch 217 downward to contact terminal 217A when actuated, to energize the coil 189A which controls the power switch for the motor of the tire wash pump 189. The lower contacts 2, 3, 4, and 5 of switch 37 are all electrically connected together by conductor 218 and to the rinse solenoid 183 and also to a main pump relay 219 which moves switch 221 downward to contact terminal 221A when actuated, to energize the electrical contactor coil 161A which controls the power switch for the motor of the main pump 161 when the manually controlled switch 223 is in the position shown. Reference numeral 161B designates overload equipment. In order to place the standby pump 162 in operation, the switch 223 may be moved to the right to allow the contactor coil 162A of the standbypump 162 to be energized when the main pump relay 219 is energized. The solenoids and relays 183, 185, 187, 203, 215, and 219 and switches 217 and 221 will be repeated for each timing meter and rotary switch 37. Conductor 225 extends to all other tire wash relay terminals 217A while conductor 227 extends to all other main pump relay terminals 221A.

Power is applied to the switch 37 from a power transformer 231 by way of a switch 223 when closed by a 24-volt timing motor 235. Motor 235 is actuated for a predetermined period by insertion of a coin in the coin slot 35. When this occurs, switch 233 is closed to allow power to be applied to the rotary switch blade 37A by way of conductor 237, conductor 239, closed switch 233, conductor 241 and conductor 243. Timing motor 235 is connected to conductor 245 by way of conductor 247. Also connected to conductor 241 is a 24-volt counter 249 which counts the number of times that the timing motor 235 is actuated and hence the number of coins deposited. Also connected between conductor 247 and conductor 241 is a 24-volt pilot light 251 which is energized when the timing motor 235 is actuated.

I claim:

1. A system for use in two stalls formed on each side of a separating wall in a coin operated vehicle cleaning facility for receiving coins from both stalls, comprising:
   a coin collector safe to be embedded in concrete, said safe having two conduits extending therefrom forming two coin inlets, one for each stall, said safe having a door formed in one end for removing the coins collected,
   metal sidewalls for surrounding said safe to define a space around said safe for receiving wet concrete whereby said metal sidewalls form part of the completed structure for holding the concrete which embeds the safe when the wet concrete is inserted into and hardens in the space between said safe and said surrounding walls,
   said sidewalls comprising two sections, each section having three sides connected together for surrounding opposite ends of said safe at positions to form a gap between said sections intermediate said opposite ends of said safe to allow said system to be inserted through an opening in the separating wall of the motor vehicle cleaning facility with the edges of said separating wall forming the opening, located in said gap whereby opposite ends of said safe may be located in the two stalls formed on opposite sides of the separating wall,
   at least one of said sections being connected to said safe.

* * * * *